(12) United States Patent
Sugano

(10) Patent No.: US 8,924,717 B2
(45) Date of Patent: Dec. 30, 2014

(54) INFORMATION PROCESSING APPARATUS, INFORMATION PROCESSING METHOD, AND COMPUTER PROGRAM

(75) Inventor: Yasuharu Sugano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/411,426

(22) Filed: Mar. 2, 2012

(65) Prior Publication Data

US 2012/0233458 A1    Sep. 13, 2012

(30) Foreign Application Priority Data

Mar. 7, 2011    (JP) .................................. 2011-048975

(51) Int. Cl.
- *H04L 29/06* (2006.01)
- *H04L 9/32* (2006.01)
- *H04L 9/08* (2006.01)

(52) U.S. Cl.
CPC ........... *H04L 9/3268* (2013.01); *H04L 63/0442* (2013.01); *H04L 9/0891* (2013.01); *H04L 63/0823* (2013.01)
USPC ............. 713/158; 713/156; 713/175; 380/30; 380/44; 380/282

(58) Field of Classification Search
CPC ............ H04L 63/0823; H04L 63/0442; H04L 9/3268; H04L 9/0891
USPC ............... 713/156–158, 175; 380/30, 44, 282
See application file for complete search history.

(56) References Cited

U.S. PATENT DOCUMENTS

| | | | | |
|---|---|---|---|---|
| 5,915,025 | A * | 6/1999 | Taguchi et al. | 380/44 |
| 7,051,206 | B1 * | 5/2006 | Giest et al. | 713/176 |
| 7,426,635 | B1 * | 9/2008 | Parkhill et al. | 713/158 |
| 8,032,744 | B2 * | 10/2011 | Doonan et al. | 713/156 |
| 2002/0032857 | A1 * | 3/2002 | Kon et al. | 713/156 |
| 2003/0018890 | A1 * | 1/2003 | Hale et al. | 713/156 |
| 2004/0123104 | A1 * | 6/2004 | Boyen et al. | 713/165 |
| 2004/0250071 | A1 * | 12/2004 | Higashiura et al. | 713/170 |
| 2005/0207578 | A1 * | 9/2005 | Matsuyama et al. | 380/231 |
| 2006/0047951 | A1 * | 3/2006 | Reilly et al. | 713/158 |
| 2006/0059346 | A1 * | 3/2006 | Sherman et al. | 713/175 |
| 2006/0129803 | A1 * | 6/2006 | Gentry et al. | 713/156 |
| 2006/0236098 | A1 * | 10/2006 | Gantman et al. | 713/158 |
| 2006/0236103 | A1 * | 10/2006 | Starr et al. | 713/168 |
| 2007/0234047 | A1 * | 10/2007 | Miyazawa | 713/158 |
| 2008/0016337 | A1 * | 1/2008 | Morgan et al. | 713/158 |
| 2008/0163338 | A1 * | 7/2008 | Micali | 726/2 |
| 2008/0172559 | A1 * | 7/2008 | Yellepeddy | 713/158 |
| 2009/0138720 | A1 * | 5/2009 | Jeong et al. | 713/176 |
| 2009/0161866 | A1 * | 6/2009 | Riedl | 380/44 |
| 2009/0327706 | A1 * | 12/2009 | Ikeda et al. | 713/156 |
| 2009/0327731 | A1 * | 12/2009 | Appenzeller et al. | 713/171 |
| 2010/0082975 | A1 * | 4/2010 | Metke et al. | 713/157 |
| 2010/0111307 | A1 * | 5/2010 | Hu et al. | 380/277 |
| 2011/0283108 | A1 * | 11/2011 | Miller | 713/175 |
| 2012/0166796 | A1 * | 6/2012 | Metke et al. | 713/158 |

FOREIGN PATENT DOCUMENTS

JP    2007-274060 A    10/2007

* cited by examiner

*Primary Examiner* — Jeffrey Pwu
*Assistant Examiner* — Jayesh Jhaveri
(74) *Attorney, Agent, or Firm* — Canon USA, Inc., I.P. Division

(57) ABSTRACT

An information processing apparatus and method that prior to using a digital certification considers a validity expiration date of the digital certificate as well as a usable deadline of an algorithm or a public key used in the digital certificate.

17 Claims, 12 Drawing Sheets

FIG.5

| SIGNATURE ALGORITHM-PUBLIC KEY SIZE | HASH ALGORITHM | USE EXPIRATION DATE |
|---|---|---|
| RSA-1024 | SHA1 | TO YEAR OF 2010 |
| DSA-1024 | SHA1 | TO YEAR OF 2010 |
| ECDSA-160 | SHA1 | TO YEAR OF 2010 |
| RSA-2048 | SHA224 | TO YEAR OF 2030 |
| DSA-2048 | SHA224 | TO YEAR OF 2030 |
| ECDSA-224 | SHA224 | TO YEAR OF 2030 |
| RSA-3072 | SHA256 | FROM YEAR OF 2030 |
| DSA-3072 | SHA256 | FROM YEAR OF 2030 |
| ECDSA-256 | SHA256 | FROM YEAR OF 2030 |

FIG.11

| | | |
|---|---|---|
| VERSION | | |
| SERIAL NUMBER | | |
| ISSUER | | |
| VALIDITY TERM | START DATE | |
| | END DATE | |
| PUBLIC KEY INFORMATION | PUBLIC KEY ALGORITHM | |
| | PUBLIC KEY | |
| SIGNATURE ALGORITHM | | |
| SIGNATURE VALUE | | |

INFORMATION PROCESSING APPARATUS, INFORMATION PROCESSING METHOD, AND COMPUTER PROGRAM

BACKGROUND OF THE INVENTION

1. Field of the Invention

The present invention relates to an information processing apparatus that uses a digital certificate.

2. Description of the Related Art

Digital certificates (hereinafter referred to as "certificates") used in, for example, encrypted communication contain the issuer of the certificate, the validity expiration date of the certificate, the public key, the certifier, or the algorithm information about the algorithm used to generate the public key. Information processing apparatuses determine whether a certificate for use of the information processing apparatus has expired or has been revoked, and restrict the use of the certificate in a case where the certificate has expired or has been revoked (for example, Japanese Patent Application Laid-Open No. 2007-274060).

Hash algorithms and signature algorithms used in certificates are designed to prevent alteration of the certificates and provide safety in use of the certificates. For example, Rivest-Shamir-Adleman (RSA), Digital Signature Algorithm (DSA), and Elliptic Curve Digital Signature Algorithm (ECDSA), which are well-known signature algorithms, maintain safety based on the difficulty of a prime factorization problem or a discrete logarithm problem, and it is difficult to acquire a secret key from a public key used in a certificate.

However, the safety of algorithms used in certificates is reduced over time because of the improvement in the capabilities of computers, mathematical advancements, and the like. For example, National Institute of Standards and Technology (NIST) in the United States has set out the guidelines about encryption algorithms used in the world, and has reported the time period for which the safety is supposed to be maintained for each algorithm and each key size. Using an algorithm and a key size beyond the reported time period increases the possibility of forgery of the certificate and leaking of the secret key.

According to the conventional techniques, information processing apparatuses determine whether a certificate for the information processing apparatus has expired, and use the certificate as long as the certificate has not expired. As a result, information processing apparatuses may keep using a certificate as long as the certificate is within its validity period even if the algorithm or the public key utilized in the certificate is beyond the guaranteed usable period. In other words, the conventional techniques check the validity expiration date of a certificate, but fail to check the usable period of the algorithm and the public key utilized in the certificate.

For example, even if an algorithm utilized in a certificate has a usable date up to 2010, the certificate having a validity expiration date of 2015 may keep being used until 2015. Currently, there are various worldwide types of software capable of generating a certificate, and an individual person can generate a certificate and a key pair (a pair of a certificate and a secret key). For a certificate and a key pair generated by an individual person, the validity expiration date is not always set to the certificate and the key pair in consideration of the usable dates of the algorithm and the public key. Some users may find the update of a certificate and a key pair bothersome, and generate a certificate and a key pair by setting a long validity period thereto. Acquiring such a certificate from an external apparatus and continuing to use it increases the possibility of forgery of the certificate and leaking of the secret key.

SUMMARY OF THE INVENTION

One aspect of the present invention is directed to providing an information processing apparatus that uses a digital certificate more safely by taking into consideration not only a validity expiration date of the digital certificate but also a usable deadline of an algorithm or a public key utilized in the digital certificate.

According to an aspect of the present invention, an information processing apparatus includes a memory and a control unit connected to the memory, the control unit configured to acquire a digital certificate from an external apparatus, acquire a usable deadline of a public key used in the digital certificate, and compare a validity expiration date of the digital certificate and the usable deadline of the public key.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a lifetime table stored in a lifetime table storage unit.

FIG. 11 illustrates an example of the certificate.

DESCRIPTION OF THE EMBODIMENTS

Various exemplary embodiments, features, and aspects of the invention will be described in detail below with reference to the drawings.

It should be noted that those exemplary embodiments are merely examples, and are not intended to limit the scope of the present invention in any manner.

Figure 12:
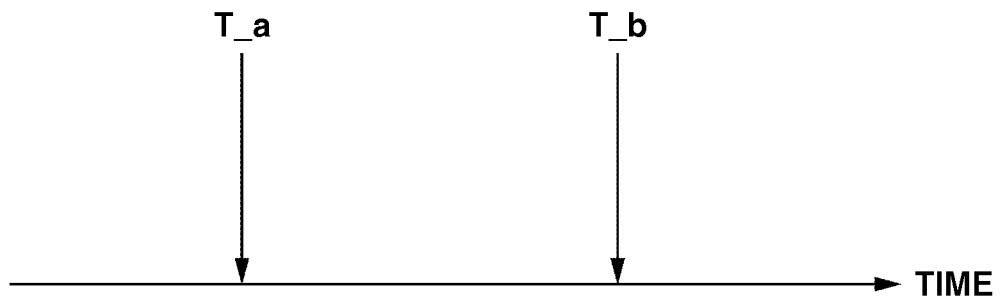
FIG. 12 illustrates the relationship between expiration dates.

In the following description, expiration dates will be compared with each other. The phrase "an expiration date $T\_a$ is earlier than an expiration date $T\_b$" means the relationship as illustrated in FIG. 12. Further, this relationship may be expressed by an inequality sign "$T\_a < T\_b$".

Figure 1:
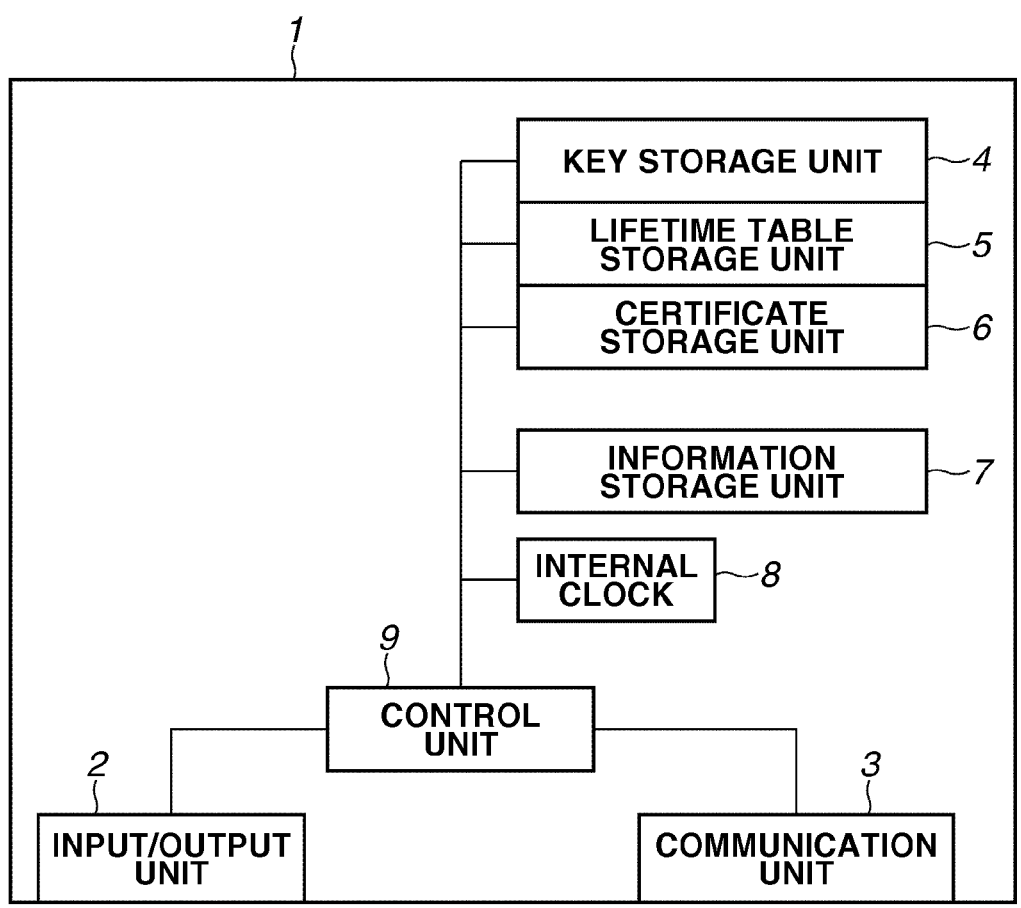
FIG. 1 illustrates the configuration of a system.

FIG. 1 illustrates a system configuration according to an exemplary embodiment of the present invention. An information processing apparatus 1 can perform encryption communication in a network by using a digital certificate (hereinafter referred to as "certificate"). The information processing apparatus 1 may be embodied by, for example, a printer, a multi functional pheripheral, a scanner, a personal computer (PC), or a server computer. The information processing apparatus 1 includes an input/output unit 2, a communication unit 3, a key storage unit 4, a lifetime table storage unit 5, a certificate storage unit 6, an information storage unit 7, an internal clock 8, and a control unit 9.

The input/output unit 2 is a user interface, and displays various kinds of information to and inputs various kinds of instructions issued from a user. The input/output unit 2 is realized by hardware devices such as a display apparatus, a keyboard, a mouse, and a touch panel. The communication unit 3 communicates with an external apparatus via a network such as a wired local area network (LAN), a wireless LAN, or a universal serial bus (USB). The communication unit 3 can import, for example, a certificate, a Certificate Revocation List (CRL), and a key pair from an external apparatus. The key storage unit 4 stores a usable key pair. The lifetime table storage unit 5 stores a lifetime table. The certificate storage unit 6 stores a usable certificate. The key storage unit 4, the lifetime table storage unit 5, and the certificate storage unit 6 are realized by a hardware device such as a non-volatile memory or a hard disc.

The key storage unit 4, the lifetime table storage unit 5, and the certificate storage unit 6 may be realized by separate hardware devices, respectively, or maybe realized by a single hardware device collectively. The information stored in the key storage unit 4, the lifetime table storage unit 5, and the certificate storage unit 6 is registered, updated, and deleted by the control unit 9.

The information storage unit 7 stores a computer program for controlling the information processing apparatus 1, information generated in information processing, and values of variables used in information processing. The information storage unit 7 is realized by a hardware device such as a random access memory (RAM), a read only memory (ROM), or a hard disc. The internal clock 8 provides date/time information indicating the current date and time. The control unit 9 controls the entire information processing apparatus 1. The control unit 9 is realized by a hardware device such as a central processing unit (CPU) or a microprocessor. The control unit 9 performs various kinds of information processing according to the program stored in the information storage unit 7.

FIG. 11 illustrates an example of a certificate. The information illustrated in FIG. 11 may be contained in a certificate depending on the type of the certificate.

The information processing apparatus 1 imports a certificate in the following manner. During the import processing, the information processing apparatus 1 may import a certificate such as X.509 or a key pair such as Public-Key Cryptography Standards No. 12 (PKCS#12). Importing a key pair will be described below. The certificate imported in the present exemplary embodiment is a self-signed certificate.

The information processing apparatus 1 can perform control according to a security policy. In the present exemplary embodiment, the following security policies can be set to the information processing apparatus 1. In a normal mode, the information processing apparatus 1 only checks the validity of a certificate to be imported. In other words, the information processing apparatus 1 checks whether the certificate has been revoked and whether the certificate has expired.

In a first secure mode, the information processing apparatus 1 checks the safety of the certificate, in addition to checking the validity of the certificate. If the result of the safety check indicates "No Good (NG)", the information processing apparatus 1 refuses to import this certificate. The check of the safety of a certificate will be described below. In a second secure mode, the information processing apparatus 1 checks the validity of a certificate, and also checks the safety of the certificate. If the result of the safety check indicates "NG", the information processing apparatus 1 provides the user with an opportunity to import the certificate if the user wishes to do so. A user instructs selects from among the normal mode, the first secure mode, and the second secure mode using the input/output unit 2.

Figure 2:
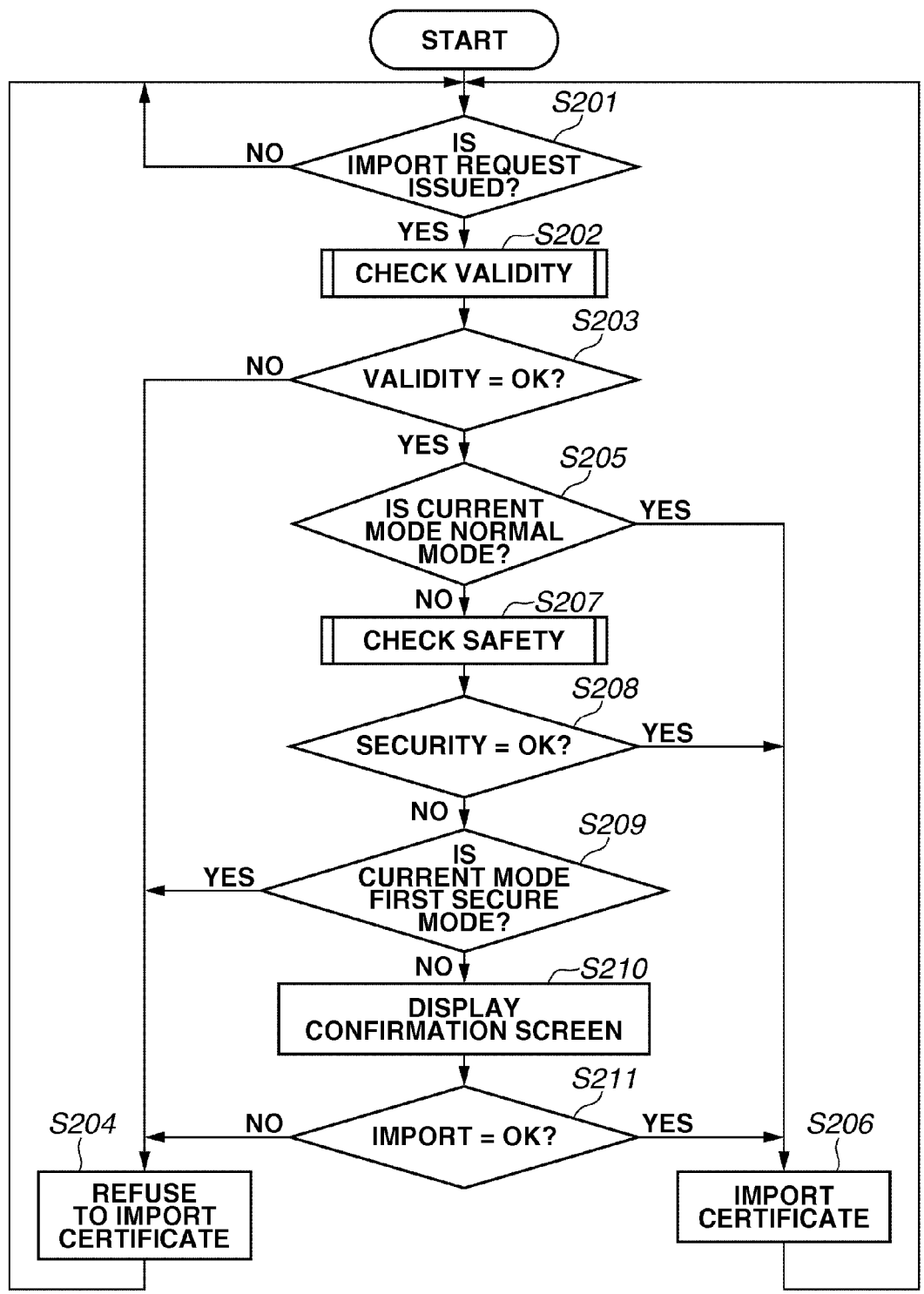
FIG. 2 is a flowchart illustrating the information processing for importing a certificate.

FIG. 2 is a flowchart illustrating the information processing for importing a certificate. The control unit 9 executes a program based on the flowchart illustrated in FIG. 2, thereby realizing the import processing.

In step S201, the control unit 9 determines whether a request to import a certificate is issued. If a user wants to import a certificate, the user requests the information processing apparatus 1 to import the certificate via the input/output unit 2. In response to this request, the communication unit 3 acquires the certificate from an external apparatus. The external apparatus may be a computer such as a personal computer or a server computer, or an external storage apparatus such as a USB memory or a file server. Alternatively, the user can also request the information processing apparatus 1 to import the certificate via the user's own PC. In this case, the PC transmits a certificate import request to the information processing apparatus 1, and at the same time, transmits the target certificate to the information processing apparatus 1. The certificate acquired from the external apparatus is first stored into the information storage unit 7. If the control unit 9 determines that there is an import request (YES in step S201), the processing proceeds to step S202. In step S202, the control unit 9 checks the validity of the certificate.

Figure 3:
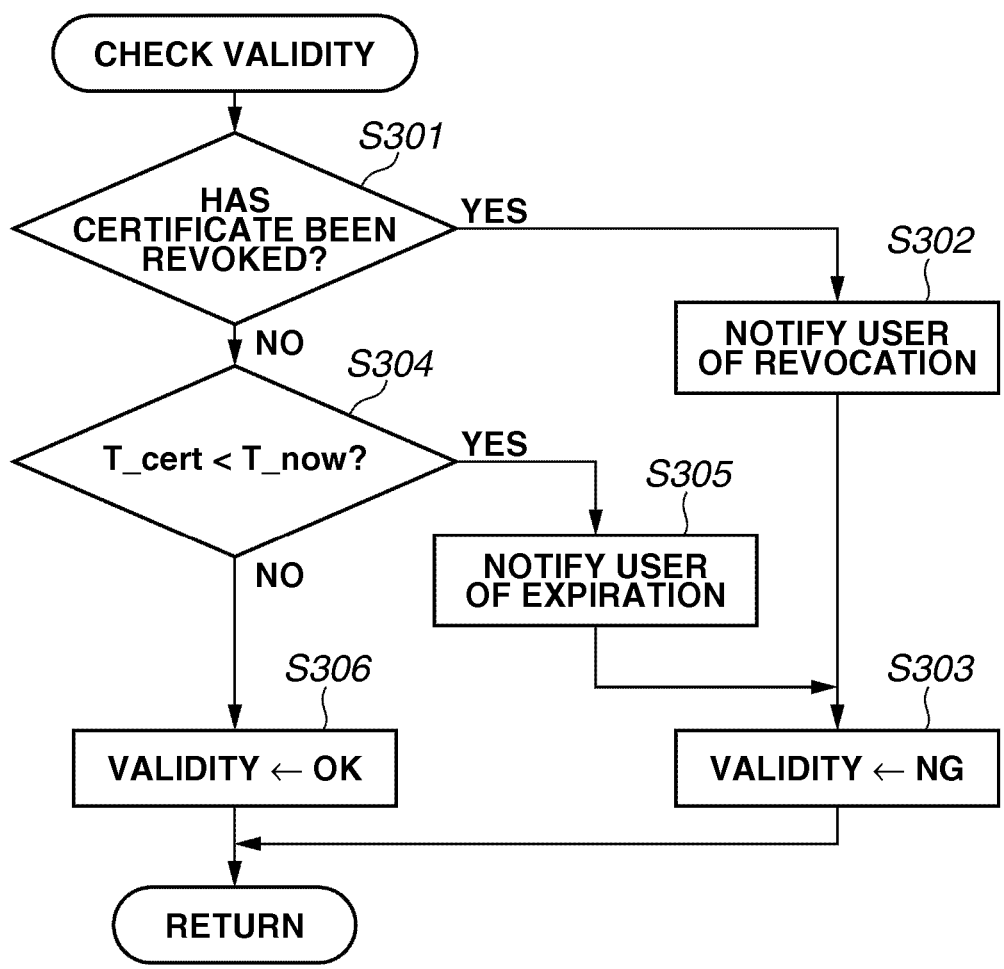
FIG. 3 is a flowchart illustrating the information processing for checking the validity of the certificate.

FIG. 3 is a flowchart illustrating the information processing for checking the validity of a certificate. The control unit 9 executes a program based on the flowchart illustrated in FIG. 3, thereby checking the validity of a certificate.

First, in step S301, the control unit 9 determines whether the certificate has been revoked. The revocation state of the certificate can be confirmed based on the CRL stored in advance in the information storage unit 7. The CRL is issued by a certificate authority or a CRL server, and the information processing apparatus 1 stores it into the information storage unit 7. If the CRL indicates that the certificate has been revoked, the control unit 9 determines that the certificate has been revoked.

Another method of confirming the revocation state of a certificate is to use an Online Certificate Status Protocol (OCSP), instead of referring to the CRL. In this case, the communication unit 3 communicates with an OCSP server using the OCSP to inquire whether the certificate has been revoked.

If the control unit 9 determines that the certificate has been revoked (YES in step S301), the processing proceeds to step S302. In step S302, the control unit 9 displays a message indicating the revocation on the input/output unit 2 to notify the user that the certificate has been revoked. Alternatively, the control unit 9 can control the communication unit 3 to transmit a message indicating that the certificate has been revoked to an external apparatus. Then, in step S303, the control unit 9 sets "NG" to a variable VALIDITY. If the control unit 9 determines that the certificate has not been revoked (NO in step S301), the processing proceeds to step S304. In step S304, the control unit 9 compares a validity expiration date T_cert with a current date/time T_now. The control unit 9 acquires the current date/time T_now from the internal clock 8. Hereinafter, "T_cert" represents the validity expiration date of the certificate that is the target of an import request.

If the current date/time T_now is later than the validity expiration date T_cert of the certificate (YES in step S304), the processing proceeds to step S305. In step S305, the control unit 9 displays a message indicating the expiration on the input/output unit 2 to notify the user that the certificate has expired. Alternatively, the control unit 9 controls the communication unit 3 to transmit a message indicating the expiration of the certificate to an external apparatus. Then, in step S303, the control unit 9 sets "NG" to the variable VALIDITY. If the current date/time T_now is earlier than or the same as the validity expiration date T_cert of the certificate (NO in step S304), the processing proceeds to step S306. In step S306, the control unit 9 sets "Okay (OK)" to the variable VALIDITY.

In the flowchart illustrated in FIG. 3, the control unit 9 first checks the revocation state of the certificate, and then checks the validity expiration date of the certificate. However, the control unit 9 may first check the validity expiration date of the certificate and then check the revocation state of the certificate.

Returning to the flowchart illustrated in FIG. 2, the rest of the certificate import processing will be described. After the control unit 9 checks the validity of the certificate, in step S203, the control unit 9 determines whether the value of the variable VALIDITY is "OK". If the value of the variable VALIDITY is "NG" (NO in step S203), the processing proceeds to step S204. In step S204, the control unit 9 does not import the certificate. As a result, the certificate is not registered into the certificate storage unit 6. If the value of the variable VALIDITY is "OK" (YES in step S203), the processing proceeds to step S205. In step S205, the control unit 9 determines whether the currently set security policy is the normal mode. If the currently set security policy is the normal mode (YES in step S205), the processing proceeds to step S206. In step S206, the control unit 9 imports the certificate. During the import processing, the control unit 9 stores the certificate in the certificate storage unit 6 to allow the certificate to be used in communication. If the currently set security policy is not the normal mode (NO in step S205), the processing proceeds to step S207. In step S207, the control unit 9 checks the safety of the certificate.

Figure 4:
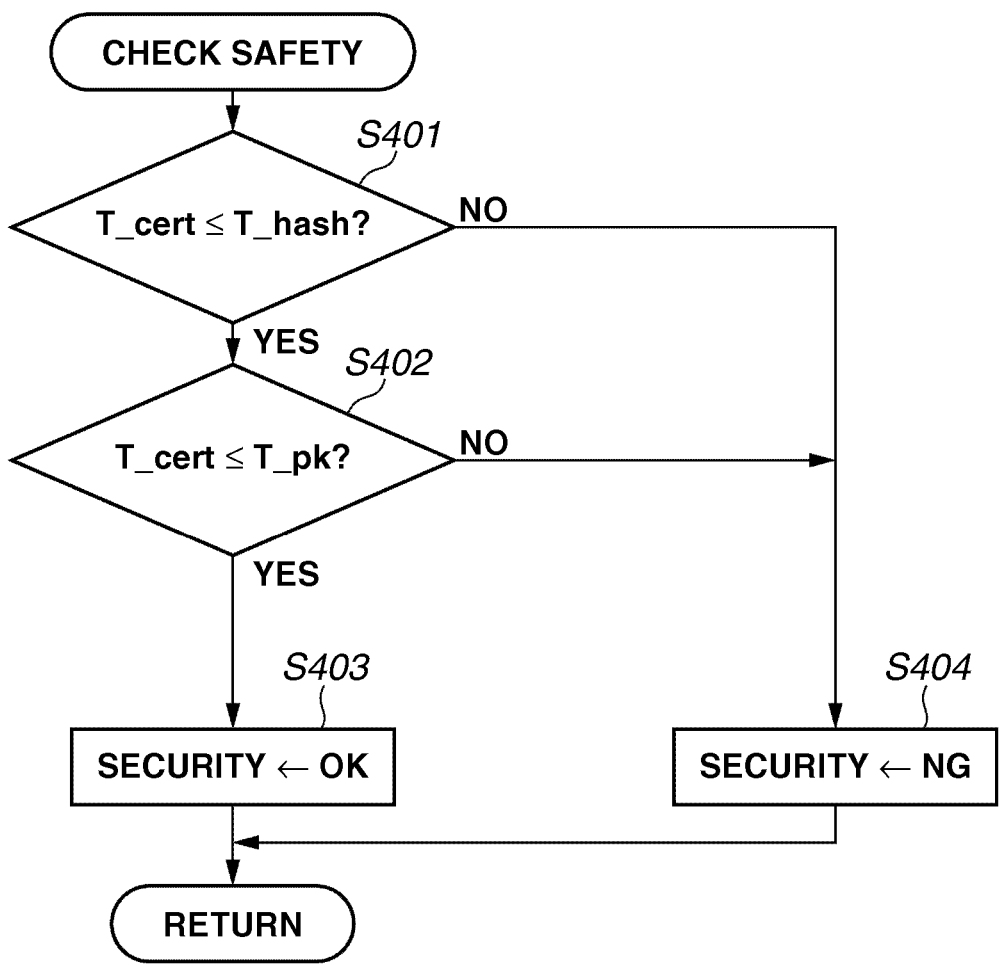
FIG. 4 is a flowchart illustrating the information processing for checking the safety of the certificate.

FIG. 4 is a flowchart illustrating the information processing for checking the safety of a certificate. The control unit 9 executes a program based on the flowchart illustrated in FIG. 4, thereby checking the safety of a certificate.

First, in step S401, the control unit 9 compares the validity expiration date T_cert of the certificate with a usable deadline T_hash of a hash algorithm used in the certificate. Examples of hash algorithms include Secure Hash Algorithm (SHA)1, SHA224, and SHA256, which have respectively different usable deadlines.

FIG. 5 illustrates the lifetime table stored in the lifetime table storage unit 5. The lifetime table contains information indicating a timeframe when a signature algorithm or a hash algorithm can be safely used. When use of the algorithm extends beyond the usable deadline stored in the table, the possibility of accessing information encrypted using the corresponding signature algorithm and the hash algorithm increases. The lifetime table is generated based on the information published by a reliable authority, such as NIST. In the present exemplary embodiment, in the lifetime table illustrated in FIG. 5, "TO YEAR OF 2010" is defined as "TO DEC. 31, 2010".

The lifetime table and the certificates can be registered and overwritten by a user having predetermined authority, such as an administrator of the information processing apparatus 1. Further, the lifetime table can be updated based on update information periodically distributed from an external server. Alternatively, the information processing apparatus 1 can acquire the update information from the external server according to an update request issued from a user. The information processing apparatus 1 can also acquire the update information from the external server in response to a request to import a certificate or a key pair.

In step S401, the control unit 9 refers to the lifetime table to acquire the usable deadline T_hash of the hash algorithm used in the certificate, and determines whether T_cert is earlier than or the same as T_hash. If the validity expiration date T_cert of the certificate is earlier than or the same as the usable deadline T_hash of the hash algorithm (YES in step S401), the processing proceeds to step S402. In step S402, the control unit 9 compares the validity expiration date T_cert of the certificate with the usable deadline T_pk of the public key contained in the certificate. The usable deadline T_pk of a public key is determined based on the signature algorithm used in generating the public key and the size of the public key. According to the lifetime table illustrated in FIG. 5, the usable deadline of a 1024-bit public key generated by RSA is the year of 2010.

In step S402, the control unit 9 refers to the lifetime table to acquire the usable deadline T_pk of the public key contained in the certificate, and determines whether the validity expiration date T_cert of the certificate is earlier than or the same as the usable deadline T_pk of the public key. If the validity expiration date T_cert of the certificate is earlier than or the same as the usable deadline T_pk of the public key (YES in step S402), the processing proceeds to step S403. In step S403, the control unit 9 sets "OK" to a variable SECURITY. If the validity expiration date T_cert of the certificate is later than the usable deadline T_hash of the hash algorithm (NO in step S401), or if the validity expiration date T_cert of the certificate is later than the usable deadline T_pk of the public key (NO in step S402), the processing proceeds to step S404. In step S404, the control unit 9 sets "NG" to the variable SECURITY. The control unit 9 can confirm what kind of hash algorithm is used in a certificate by referring to the information "signature" in the certificate. The control unit 9 can confirm what kind of public key is contained in a certificate by referring to the information "subjectPublicKeyinfo" in the certificate.

In the flowchart illustrated in FIG. 4, the control unit 9 first compares the validity expiration date of the certificate with the usable deadline of the hash algorithm, and then compares the validity expiration date of the certificate with the usable deadline of the public key. The control unit 9 can perform these comparisons in the reverse order.

Returning to the flowchart illustrated in FIG. 2, the rest of the certificate import processing will be described. After the control unit 9 checks the safety of the certificate, in step S208, the control unit 9 determines whether the value of the variable SECURITY is "OK". If the value of the variable SECURITY is "OK" (YES in step S208), the processing proceeds to step S206. In step S206, the control unit 9 imports the certificate. If the value of the variable SECURITY is "NG" (NO in step S208), the processing proceeds to step S209. In step S209, the control unit 9 determines whether the currently set security policy is the first secure mode. If the currently set security policy is the first secure mode (YES in step S209), the processing proceeds to step S204. In step S204, the control unit 9 does not import the certificate. As a result, the certificate is not registered into the certificate storage unit 6. If the currently set security mode is the second security mode (NO in step S209), the processing proceeds to step S210. In step S210, the control unit 9 displays a confirmation screen on the input/output unit 2 to issue a warning about the safety of the certificate.

Figure 6:
FIG. 6 illustrates an example of a confirmation screen displayed in step S210.

FIG. 6 illustrates an example of the confirmation screen displayed in step S210. This confirmation screen indicates that the guarantee of the safety of the certificate does not last until the validity expiration date of the certificate, and provides a user with an option whether the user still wants to import this certificate.

If the user wants to view the details of the certificate, the user presses a button 601. Then, the control unit 9 displays the detailed information about the certificate on the input/output unit 2. If the user wants to import the certificate, the user presses a button 602. Then, the control unit 9 sets "OK" to a variable IMPORT. If the user wants to cancel the import of the certificate, the user presses a button 603. Then, the control unit 9 sets "NG" to the variable IMPORT.

In step S211, the control unit 9 determines whether the value of the variable IMPORT is "OK". If the value of the variable IMPORT is "OK" (YES in step S211), the processing proceeds to step S206. In step S206, the control unit 9 imports the certificate. If the value of the variable IMPORT is "NG" (NO in step S211), the processing proceeds to step S204. In step S204, the control unit 9 does not import the certificate.

A second exemplary embodiment of the present invention will now be described. In the second exemplary embodiment, the information processing apparatus 1 imports a key pair comprised of a secret key and a certificate. One example of a key pair is PKCS#12. The certificate is a self-signed certificate.

Figure 7:
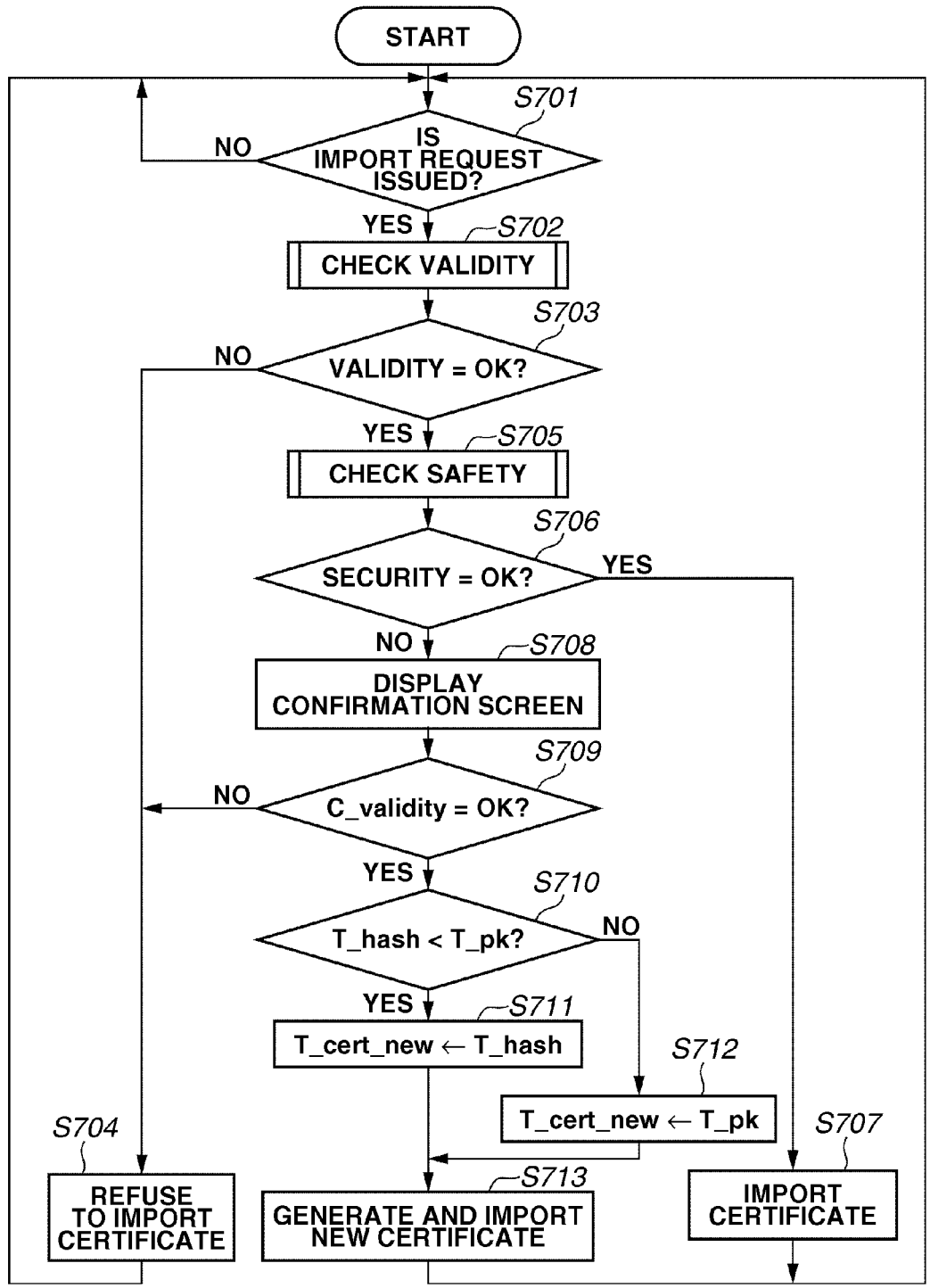
FIG. 7 is a flowchart illustrating the information processing for importing a key pair.

FIG. 7 is a flowchart illustrating the information processing for importing a key pair. The control unit 9 executes a program based on the flowchart illustrated in FIG. 7, thereby realizing the import processing.

In step S701, the control unit 9 determines whether a request to import a key pair is issued. If a user wants to import a key pair, the user requests, via the input/output unit 2, the information processing apparatus 1 to import the key pair. In response to this request, the communication unit 3 acquires the key pair from an external apparatus. The external apparatus maybe a computer such as a personal computer or a server computer, or an external storage apparatus such as a USB memory or a file server. Alternatively, the user can also request the information processing apparatus 1 to import the key pair via the user's own PC. In this case, the PC transmits a request to import the key pair to the information processing apparatus 1, and at the same time, transmits the target key pair to the information processing apparatus 1. If the control unit 9 determines that an import request is issued (YES in step S701), the processing proceeds to step S702. In step S702, the control unit 9 analyzes the key pair and checks the validity of the certificate contained in the key pair. In step S702, the control unit 9 performs the information processing based on the flowchart illustrated in FIG. 3.

After the control unit 9 checks the validity of the certificate, in step S703, the control unit 9 determines whether the value of the variable VALIDITY is "OK". If the value of the variable VALIDITY is "NG" (NO in step S703), the processing proceeds to step S704. In step S704, the control unit 9 does not import the key pair. As a result, the key pair is not registered in the key storage unit 4. If the value of the variable VALIDITY is "OK" (YES in step S703), the processing proceeds to step S705. In step S705, the control unit 9 checks the safety of the certificate contained in the key pair. In step S705, the control unit 9 performs the information processing based on the flowchart illustrated in FIG. 4.

After the control unit 9 checks the safety of the certificate, in step S706, the control unit 9 determines whether the value of the variable SECURITY is "OK". If the value of the variable SECURITY is "OK" (YES in step S706), the processing proceeds to step S707. In the step S707, the control unit 9 imports the key pair. During the import processing, the control unit 9 stores the key pair in the key storage unit 4 to allow the key pair to be used in communication. If the value of the variable SECURITY is "NG" (NO in step S706), the processing proceeds to step S708. In step S708, the control unit 9 displays a confirmation screen on the input/output unit 2.

Figure 8:
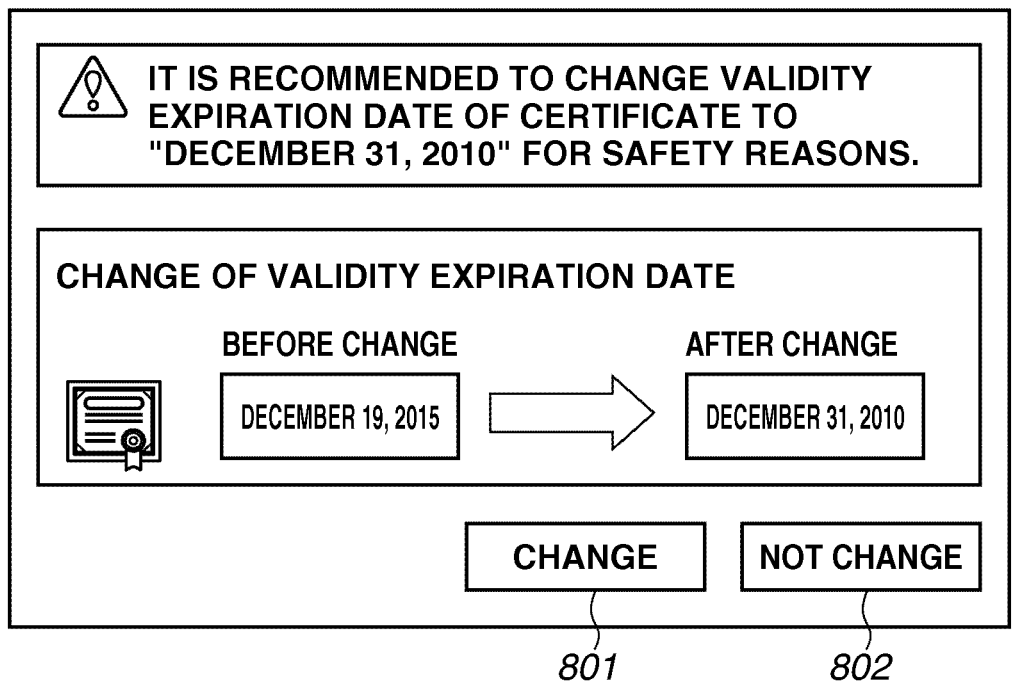
FIG. 8 illustrates an example of a confirmation screen displayed in step S708.

FIG. 8 illustrates an example of the confirmation screen displayed in step S708. This confirmation screen provides a user with an option of regenerating a safer certificate by setting ahead the validity expiration date of the certificate contained in the key pair. If the user wants to change the validity expiration date of the certificate, the user presses a button 801. Then, the control unit 9 sets "OK" to a variable C_validity. If the user does not want to change the validity expiration date of the certificate, the user presses a button 802. Then, the control unit 9 sets "NG" to the variable C_validity.

In step S709, the control unit 9 determines whether the value of the variable C_validity is "OK". If the value of the variable C_validity is "NG" (NO in step S709), the processing proceeds to step S704. In step S704, the control unit 9 does not import the key pair. If the value of the variable C_validity is "OK" (YES in step S709), the processing proceeds to step S710. In step S710, the control unit 9 compares the usable deadline T_hash of the hash algorithm of the certificate with the usable deadline T_pk of the public key of the certificate. In particular, in step S710, the control unit 9 refers to the lifetime table to acquire both the usable deadline T_hash of the hash algorithm and the usable deadline T_pk of the public key, and determines whether the usable deadline T_hash of the hash algorithm is earlier than the usable deadline T_pk of the public key.

If the usable deadline T_hash of the hash algorithm is earlier than the usable deadline T_pk of the public key (YES in step S710), the processing proceeds to step 711. In step S711, the control unit 9 sets the usable deadline T_hash of the hash algorithm to a validity expiration date T_cert_new of a certificate to be newly generated. If the usable deadline T_hash of the hash algorithm is the same as or later than the usable deadline T_pk of the public key (NO in step S710), the processing proceeds to step S712. In step S712, the control unit 9 sets the usable deadline T_pk of the public key to the validity expiration date T_cert_new of the certificate to be newly generated. Then, in step S713, the control unit 9 generates a new certificate that is valid until the validity expiration date T_cert_new by using the secret key contained in the key pair that is the target of the import request.

The version supported by the information processing apparatus 1 is set to the version information of the new certificate. The number issued by the information processing apparatus 1 is set to the serial number of the new certificate. The public key algorithm information of the certificate contained in the secret key pair is set to the public key algorithm information of the new certificate. The signature algorithm information and the public key of the certificate contained in the key pair are set to the signature algorithm and the public key of the new certificate. The current date and time are set to the start date of the validity term of the new certificate. The validity expiration date T_cert_new is set to the end date of the validity term of the new certificate. The control unit 9 calculates a hash value from the unsigned certificate containing the above-described information using the hash algorithm specified by the signature algorithm, and calculates a signature value from the hash value using the secret key, thereby generating a self-signed certificate.

Then, in step S713, the control unit 9 stores a new key pair comprised of the secret key and the new certificate in the key storage unit 4. In step S713, the control unit 9 registers the key pair in the key storage unit 4 after changing the validity expiration date of the certificate contained in the key pair to be imported. As a result, the safety of the certificate can be further enhanced.

A third exemplary embodiment of the present invention will now be described. In the third exemplary embodiment, the information processing apparatus 1 imports a key pair comprised of a secret key and a certificate. One example of a key pair is PKCS#2. The certificate is a self-signed certificate.

Figure 9:
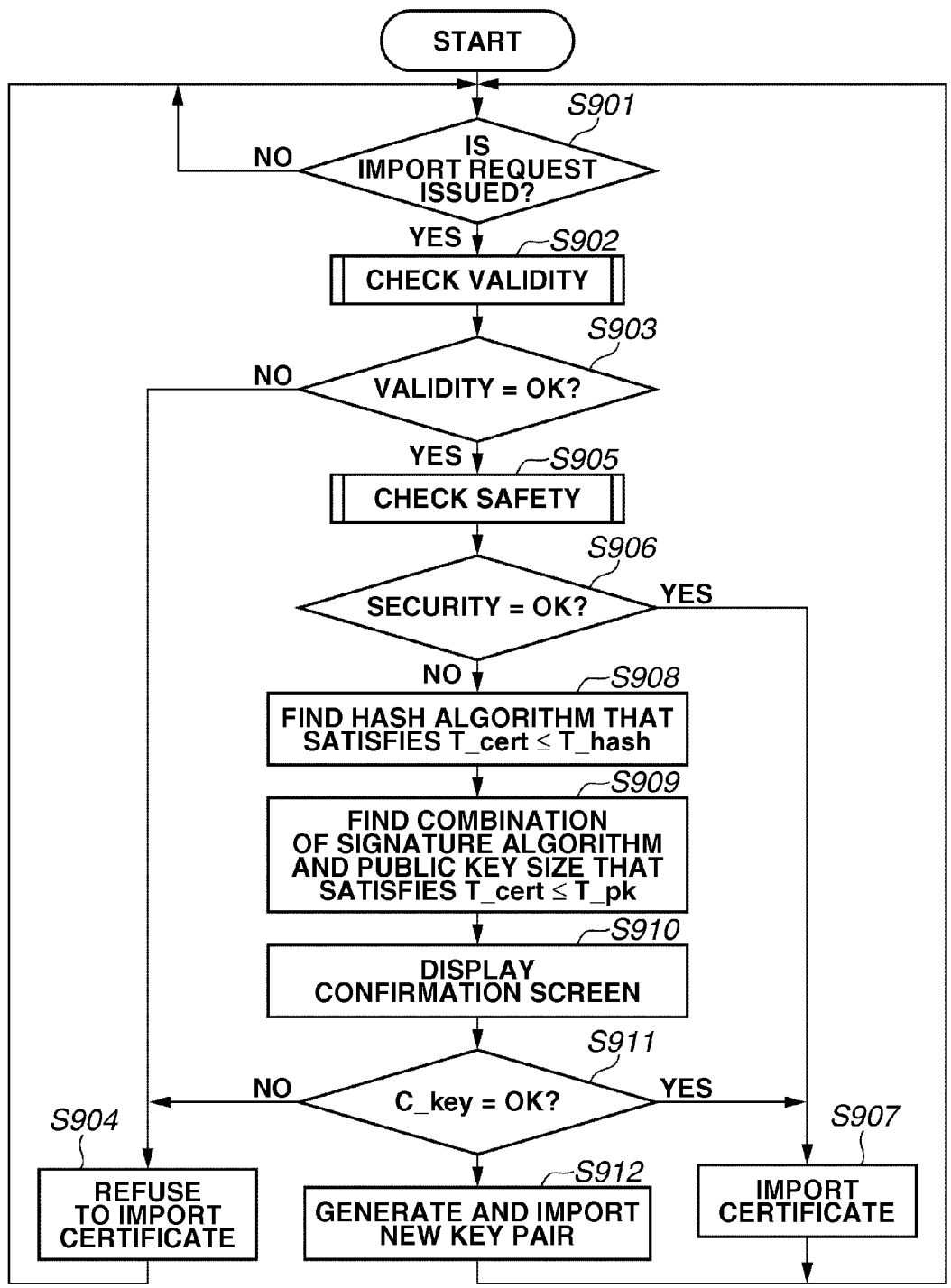
FIG. 9 is a flowchart illustrating the information processing for importing a key pair.

FIG. 9 is a flowchart illustrating the information processing for importing a key pair. The control unit 9 executes a program based on the flowchart illustrated in FIG. 9, thereby realizing the import processing.

In step S901, the control unit 9 determines whether a request to import a key pair is issued. If a user wants to import a key pair, the user requests, via the input/output unit 2, the information processing apparatus 1 to import the key pair. In response to this request, the control unit 3 acquires the key pair from an external apparatus. The external apparatus maybe a computer such as a personal computer or a server computer, or an external storage apparatus such as a USB memory or a file server. Alternatively, the user can also request the information processing apparatus 1 to import the key pair via the user's own PC. In this case, the PC transmits a request to import the key pair to the information processing apparatus 1, and at the same time, transmits the target key pair to the information processing apparatus 1. If the control unit 9 determines that an import request is issued (YES instep S901), the processing proceeds to step S902. In step S902, the control unit 9 analyzes the key pair, and checks the validity of the certificate contained in the key pair. In step S902, the control unit 9 performs the information processing based on the flowchart illustrated in FIG. 3.

After the control unit 9 checks the validity of the certificate, in step S903, the control unit 9 determines whether the value of the variable VALIDITY is "OK". If the value of the variable VALIDITY is "NG" (NO instep S903), the processing proceeds to step S904. In step S904, the control unit 9 does not import the key pair. As a result, the key pair is not registered in the key storage unit 4. If the value of the variable VALIDITY is "OK" (YES in step S903), the processing proceeds to step S905. In step S905, the control unit 9 checks the safety of the certificate contained in the key pair. In step S905, the control unit 9 performs the information processing based on the flowchart illustrated in FIG. 4.

After the control unit 9 checks the safety of the certificate, in step S906, the control unit 9 determines whether the value of the validity SECURITY is "OK". If the value of the variable SECURITY is "OK" (YES in step S906), the processing proceeds to step S907. In step S907, the control unit 9 imports the key pair. During the import processing, the control unit 9 stores the key pair in the key storage unit 4 to allow the key pair to be used in communication. If the value of the variable SECURITY is "NG" (NO in step S906), the processing proceeds to step S908. In step S908, the control unit 9 selects a hash algorithm. In particular, in step S908, the control unit 9 refers to the lifetime table to find one or more hash algorithms that satisfy [the validity expiration date of the certificate T_cert≤the usable deadline of the hash algorithm $T_{13}$ hash], and then identifies the hash algorithm having the earliest usable deadline from among the found hash algorithms. In other words, the control unit 9 selects the hash algorithm that will reach its usable deadline first after the date of T_cert.

For example, if T_cert is Dec. 19, 2015, SHA 224 is the hash algorithm having the earliest T_hash among the hash algorithms that satisfy [T_cert≤T_hash]. In a case where the information processing apparatus 1 does not support SHA224, the control unit 9 selects SHA256 instead.

Further, in step S909, the control unit 9 selects a combination of a signature algorithm and a public key size. In particular, in step S909, the control unit 9 refers to the lifetime table to find one or more combinations of a signature algorithm and a public key size that satisfy [the validity expiration date of the certificate T_cert≤the usable deadline of the public key T_pk], and identifies the combination having the earliest T_pk among the found combinations. In other words, the control unit 9 selects the combination of the signature algorithm and the public key size that will reach its usable deadline first after the date of T_cert. The usable deadline T_pk of a public key is determined based on the signature algorithm used in generating the public key, and the public key size. For example, for a certificate having T_cert of Dec. 19, 2015, the control unit 9 selects RSA-2048. In step S910, the control unit 9 displays a confirmation screen on the input/output unit 2.

Figure 10:
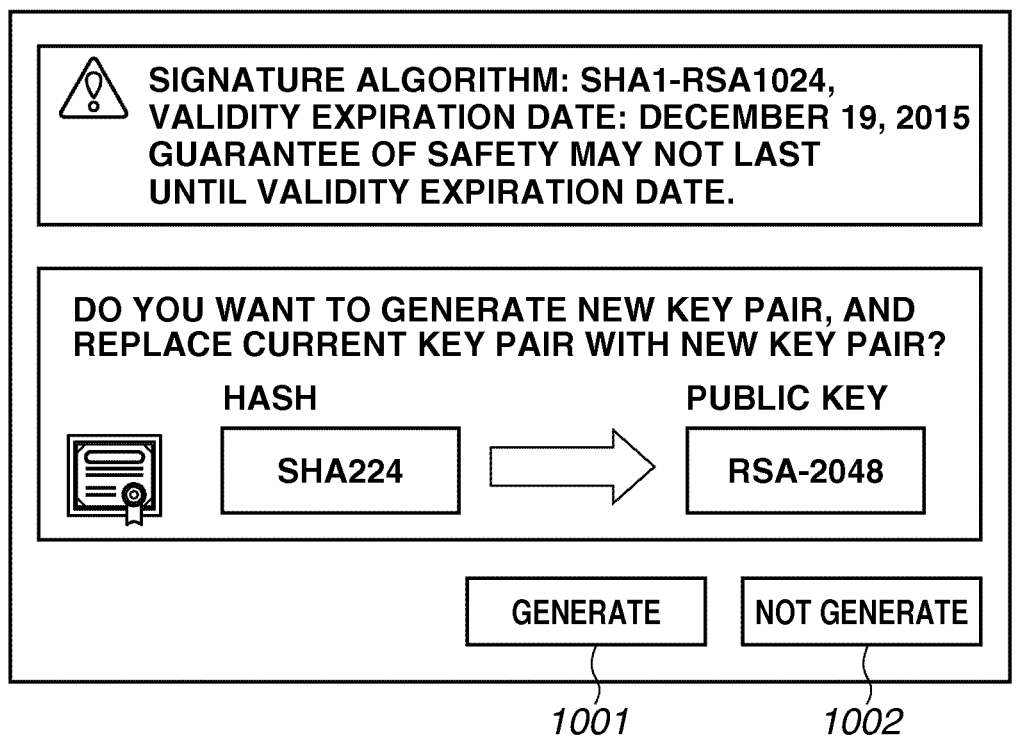
FIG. 10 illustrates an example of a confirmation screen displayed in step S810.

FIG. 10 illustrates an example of the confirmation screen displayed in step S810. This confirmation screen provides a user with an opportunity to generate a more secure key pair. If the user wants to generate a new key pair, the user presses a button 1001. Then, the control unit 9 sets "OK" to a variable C_key. If the user does not want to generate a new key pair, the user presses a button 1002. Then, the control unit 9 sets "NG" to the variable C_key.

In step S911, the control unit 9 determines whether the value of the variable C_key is "OK". If the value of the variable C_key is "NG" (NO in step S911), the processing proceeds to step S904. In step S904, the control unit 9 does not import the secret key. If the value of the variable C_key is "OK" (YES in step S911), the processing proceeds to step S912. In step S912, the control unit 9 generates a new key pair using the hash algorithm identified in step S908 and the combination of the signature algorithm and the public key size identified in step S909. Further, in step S912, the control unit 9 stores the new key pair in the key storage unit 4.

During the generation of the key pair, the control unit 9 generates a secret key and a public key according to the signature algorithm and the public key size identified in step S909. Subsequently, the control unit 9 generates a certificate in the form of X.509, and then adds a signature to the certificate using the hash algorithm identified instep S908 and the secret key. In this way, the control unit 9 generates a key pair comprised of the secret key and the certificate.

The version supported by the information processing apparatus 1 is set to the version information of the new certificate. The number issued by the information processing apparatus 1 is set to the serial number of the new certificate. The public key algorithm information of the new certificate is determined from the combination of the signature algorithm and the public key size identified in step S909. The signature algorithm information of the new certificate is determined from the hash algorithm identified in step S908 and the combination of the signature algorithm and the public key size identified in step S909. For example, if the hash algorithm is SHA224, the signature algorithm is RSA, and the public key size is 2048 bits, the signature algorithm information is SHA224-RSA (sha224WithRSAEncryption). The current date and time are set to the start date of the validity term of the new certificate. The validity expiration date T_cert is set to the end date of the validity term of the new certificate. The newly generated public key is set as the public key of the new certificate. The control unit 9 calculates a hash value from the unsigned certificate containing the above-described information using the hash algorithm specified by the signature algorithm, and calculates a signature value from the hash value using the newly generated secret key, thereby generating a self-signed certificate. The control unit 9 can prompt the user to input a password, and generate a certificate in the form of PKCS#12 using the password.

In the above-described exemplary embodiments, in the lifetime table illustrated in FIG. 5, "TO YEAR OF 2010" means "TO Dec. 31, 2010". However, in other embodiments, the definition may be changed such that "TO YEAR OF 2010" means "TO Jan. 1, 2010". Selecting either definition is within design consideration of the information processing apparatus 1.

According to the exemplary embodiments of the present invention, it is possible to use a digital certificate more safely by taking into consideration both the validity expiration date of the certificate as well as the usable deadlines of the algorithm and the public key used in the certificate.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-048975 filed Mar. 7, 2011, which is hereby incorporated by reference herein in its entirety.

What is claimed is:

1. An information processing apparatus comprising:
a memory; and
a control unit, connected to the memory, the control unit configured to:
acquire a digital certificate from an external apparatus;
acquire a first safe period for which a first public key used for the digital certificate is determined to be safe;
compare a validity expiration date of the digital certificate and the first safe period of the first public key; and
generate a second public key which is determined to be safe for a second safe period equal to or later than the validity expiration date of the digital certificate,
wherein a digital certificate based on the generated second public key is registered as a usable digital certificate based on a result of comparing the validity expiration date of the digital certificate and the period of the first public key.

2. The information processing apparatus according to claim 1, wherein, each of the first and second public keys is one of a first type and a second type of public key which are generated by different algorithms or whose sizes are different;
the information processing apparatus further comprising a table storage unit configured to store a table determining a safe period for which a public key for each of the first and second types is determined to be safe,
wherein the first safe period of the first public key used in the digital certificate is acquired from the table.

3. The information processing apparatus according to claim 1, further comprising:
a storage unit configured to store a usable digital certificate,
wherein the control unit is further configured to register the acquired digital certificate in the storage unit in a case where the validity expiration date of the acquired digital certificate is earlier than the first safe period of the first public key.

4. The information processing apparatus according to claim 3, wherein the control unit is further configured to determine whether the acquired digital certificate has expired, and
wherein the acquired digital certificate is not registered in the storage unit in a case where the acquired digital certificate has expired.

5. The information processing apparatus according to claim 1, further comprising:
a storage unit configured to store a usable digital certificate,
wherein the control unit is further configured to register the digital certificate based on the generated second public key in the storage unit.

6. An information processing apparatus comprising:
a memory; and
a control unit, connected to the memory, the control unit configured to:
acquire a digital certificate from an external apparatus;
acquire a first safe period for which a first algorithm used for the digital certificate is determined to be safe;
compare a validity expiration date of the digital certificate and the first safe period of the algorithm; and
determine a second algorithm which is determined to be safe for a second safe period equal to or later than the validity expiration date of the digital certificate,
wherein a digital certificate based on the determined second algorithm is registered as a usable digital certificate based on a result of comparing the validity expiration date of the digital certificate and the first safe period of the first algorithm.

7. The information processing apparatus according to claim 6, wherein each of the first and second algorithms used for the digital certificate is a hash algorithm or a signature algorithm.

8. An information processing method utilized by an information processing apparatus, the information processing method comprising:
acquiring a digital certificate from an external apparatus;
acquiring a first safe period for which a first public key used for the digital certificate is determined to be safe;
comparing a validity expiration date of the digital certificate and the period of the first public key;
generating a second public key which is determined to be safe for a second period equal to or later than the validity expiration date of the digital certificate; and
registering a digital certificate based on the generated second public key as a usable digital certificate based on a result of comparing the validity expiration date of the digital certificate and the first safe period of the first public key.

9. An information processing method utilized by an information processing apparatus, the information processing method comprising:
- acquiring a digital certificate from an external apparatus;
- acquiring a first safe period for which a first algorithm used for the digital certificate is determined to be safe;
- comparing a validity expiration date of the digital certificate and the first safe period of the first algorithm;
- determining a second algorithm which is determined to be safe for a second safe period equal to or later than the validity expiration date of the digital certificate; and
- registering a digital certificate based on the determined second algorithm as a usable digital certificate based on a result of comparing the validity expiration date of the digital certificate and the first safe period of the first algorithm.

10. A non-transitory computer-readable storage medium storing a computer program for causing an image processing apparatus to implement the method of claim 8.

11. A non-transitory computer-readable storage medium storing a computer program for causing an image processing apparatus to implement the method of claim 9.

12. The information processing apparatus according to claim 1, wherein
- the acquired digital certificate is registered as the usable digital certificate in a case where the validity expiration date of the acquired digital certificate is earlier than the first safe period of the first public key, and
- the digital certificate based on the generated public key is registered as the usable digital certificate in a case where the validity expiration date of the acquired digital certificate is later than the period of the public key.

13. The information processing apparatus according to claim 1, wherein the digital certificate includes the public key used for the digital certificate.

14. The information processing apparatus according to claim 1, further comprising:
- a selection unit configured to allow a user to select one of a first mode to register the digital certificate as the usable digital certificate not based on the result of the comparing and a second mode to register the digital certificate as the usable digital certificate based on the result of the comparing.

15. The information processing apparatus according to claim 6, wherein
- the acquired digital certificate is registered as the usable digital certificate in a case where the validity expiration date of the acquired digital certificate is earlier than the first safe period of the first algorithm, and
- the digital certificate based on determined second algorithm is registered as the usable digital certificate in a case where the validity expiration date of the acquired digital certificate is later than the first safe period of the first algorithm.

16. The information processing apparatus according to claim 6, wherein the digital certificate includes information indicating the algorithm used for the digital certificate.

17. The information processing apparatus according to claim 6, further comprising:
- a selection unit configured to allow a user to select one of a first mode to register the digital certificate as the usable digital certificate not based on the result of the comparing and a second mode to register the digital certificate as the usable digital certificate based on the result of the comparing.

* * * * *